Figure 1:
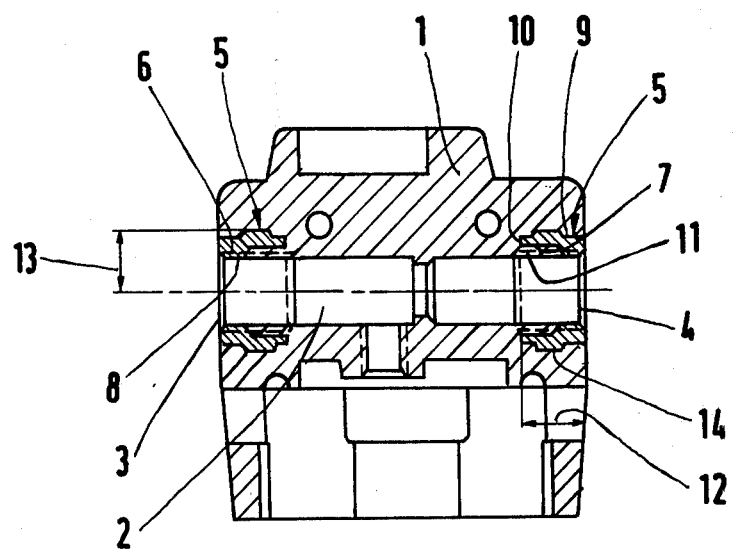

United States Patent [19]

Heilmann

[11] 4,146,059

[45] Mar. 27, 1979

[54] PLASTIC MEMBER HAVING A REINFORCING ELEMENT AT THE MOUTH OF A FLOW APERTURE THEREOF

[75] Inventor: Roland Heilmann, Neuenhaus, Fed. Rep. of Germany

[73] Assignee: J. Lorch Gesselschaft & Co. KG, Waldenbuch, Fed. Rep. of Germany

[21] Appl. No.: 814,927

[22] Filed: Jul. 12, 1977

[30] Foreign Application Priority Data

Jul. 16, 1976 [DE] Fed. Rep. of Germany ....... 2631993

[51] Int. Cl.² .......................... F16L 15/00; F16L 9/12
[52] U.S. Cl. .................................. 138/109; 138/174; 285/239; 285/291
[58] Field of Search .................. 138/109, 174; 428/36; 308/237 R, 238, 239; 85/32 R, 32 K; 285/21, 45, 239, 284, 289, 291

[56] References Cited

U.S. PATENT DOCUMENTS

| 2,850,064 | 9/1958 | Rapata | 85/32R |
|---|---|---|---|
| 2,882,072 | 4/1959 | Noland | 138/109 |
| 3,104,136 | 9/1963 | Merriman | 308/237 R |
| 3,174,523 | 3/1965 | Hult | 85/32 R |
| 3,561,307 | 2/1971 | Mortensen | 85/32 R |
| 3,565,116 | 2/1971 | Gabin | 285/45 |
| 3,614,137 | 10/1971 | Jacobson | 138/174 |
| 3,788,928 | 1/1974 | Wise | 285/21 |

*Primary Examiner*—Richard R. Stearns
*Attorney, Agent, or Firm*—Watson, Cole, Grindle & Watson

[57] ABSTRACT

A housing includes a plastic member having a central opening, and a reinforcing element of wholly rigid and imperforate material in the form of a hollow sleeve imbedded within the member. This sleeve is coincident with the opening and has an outer end flush with an outer end of the member. A first inner wall portion of the sleeve adjacent such one end has a diameter equal to the diameter of the central opening, and this first inner wall portion being threaded for engagement with a threaded object to be connected to the housing. The sleeve has a second inner wall portion of a diameter greater than the diameter of the opening so as to define an annular space which is occupied by a portion of the plastic member.

3 Claims, 2 Drawing Figures

PLASTIC MEMBER HAVING A REINFORCING ELEMENT AT THE MOUTH OF A FLOW APERTURE THEREOF

The present invention relates to a plastic member, such as a housing, etc., having a reinforcing element at the mouth of a flow aperture thereof, and capable of being placed in a sleeve-like mold at the time of fabrication of the plastic member. The mouth of the flow aperture in plastic housings of this type are frequently subject to severe mechanical stress, especially if valves, fittings, pipes, etc. are to be screwed into the mouth. It is known practice to provide a metallic sleeve at the mouth, with the outside and interior end of such sleeve being molded in plastic. While this does provide sufficient mechanical reinforcement, the reinforcing member cannot be attached to the plastic in a completely leakproof manner, so that leaks occur at the mouth, especially if a pressurized medium flows through the flow aperture.

It is therefore an object of the present invention to design and arrange the reinforcing member in such a manner as to avoid leakage and make it impossible for any of the media coming from the flow aperture to egress at the mouth on the outside of the reinforcing member.

According to the present invention, this object is achieved in that the plastic is drawn around that end of the sleeve which is opposite the mouth and covers at least a portion of the interior of the sleeve, in addition to the outside. In this manner, the plastic on the interior of the sleeve, which is connected with the plastic on the outside of the sleeve in the area of the interior end of the sleeve, is pressed against the interior of the sleeve by means of a connection member which is screwed in and the medium flowing therethrough, thereby providing an absolutely secure connection in conjunction with a 180° reversal.

Figure 2:
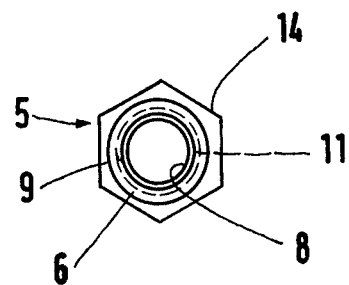

A practical example of the present invention is illustrated in the drawings and described in detail below. In the drawings;

FIG. 1 is a longitudinal sectional view taken through a plastic member in the form of a housing; and FIG. 2 is a top view of a reinforcing member in the form of a threaded sleeve.

The plastic member 1, designed in the form of a housing, has a flow aperture 2 with mouths 3, 4. Reinforcing members 5 are inserted in order to reinforce these mouths, to which valves, fittings, pipes, measuring equipment, etc. are to be attached; reinforcing members 5 are designed as sleeves 6 of metal, especially brass, and have a thread 8 in the interior 7 thereof. When the plastic member is fabricated, sleeves 6 are inserted in the corresponding mould and then surrounded by plastic. The design is such that the plastic not only surrounds the outside 9 and the interior end 10 of sleeve 6, but also at least a portion of interior 7, with a merger of the plastic on interior 7 and on outside 9 in the area of end 10. At the mouth end, thread 8 of the sleeve is followed by a recess 11, which is filled with the plastic, in which thread 8 can be continued.

The length 12 of sleeve 6 is preferably kept longer than its radius 13, and the plastic on interior 7 is extended more than one half of length 12.

By screwing in the male thread of a valve, fitting, pipe, etc., (not shown) and possibly through the pressure of the medium flowing through flow aperture 2, the plastic is pressed against interior 7 of sleeve 6, thereby preventing, in conjunction with the 180° reversal at interior end 10 at mouths 3, 4 at outside 9 of reinforcing member 5, any medium from egressing out of flow aperture 2. Special anchor projections 14 ensure a secure connection with plastic member 1, both axially and radially.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A housing, comprising, a plastic member having a central opening of a first predetermined diameter, a reinforcing element of wholly rigid and imperforate material in the form of a hollow sleeve imbedded within said member and having a predetermined length, said sleeve being coincident with said opening and having an outer end flush with an outer end of said member, said sleeve having a first inner wall portion adjacent said outer end of said sleeve and having an inner surface with a predetermined diameter equal to said first diameter, said first inner wall portion being threaded for engagement with a threaded object to be connected to the housing, said sleeve having a second inner wall portion extending between said first portion and an opposite end of said sleeve, said second portion having an inner surface with a predetermined diameter greater than said first diameter to define an annular space between said inner surface of said second portion and said first diameter, a portion of said plastic member occupying said space, and said portion being internally threaded and forming an extension of said inner surface of said first inner wall portion, whereby any leakages through said member from said opening to said outer end of said sleeve are minimized by said rigid and imperforate sleeve since they are confined to a path of abruptly changing direction defined along said inner surface of said second portion and along an inner end and an outer surface of said sleeve, and whereby the threaded object to be connected to the housing threadedly engages said threaded portions so that said portion of said plastic material effectively tightens against said inner surface of said second portion and against the threaded object to be connected to the housing to thereby interrupt said path.

2. The housing according to claim 1, wherein said sleeve has an outer radius which is less than said length thereof, and the extent of said second wall portion is greater than the extent of said first wall portion.

3. The housing according to claim 1, wherein anchoring projections are provided on an outer wall of said sleeve.

* * * * *

UNITED STATES PATENT OFFICE
CERTIFICATE OF CORRECTION

PATENT NO. : 4,146,059
DATED : March 27, 1979
INVENTOR(S) : Roland Heilmann

It is certified that error appears in the above-identified patent and that said Letters Patent are hereby corrected as shown below:

In the title page, correct the name of the assignee to read "Festo-Mashinenfabrik Gottlieb Stoll, Esslingen, Federal Republic of Germany."

Signed and Sealed this

Seventeenth Day of June 1980

[SEAL]

Attest:

SIDNEY A. DIAMOND

Attesting Officer     Commissioner of Patents and Trademarks